United States Patent Office 3,284,189
Patented Nov. 8, 1966

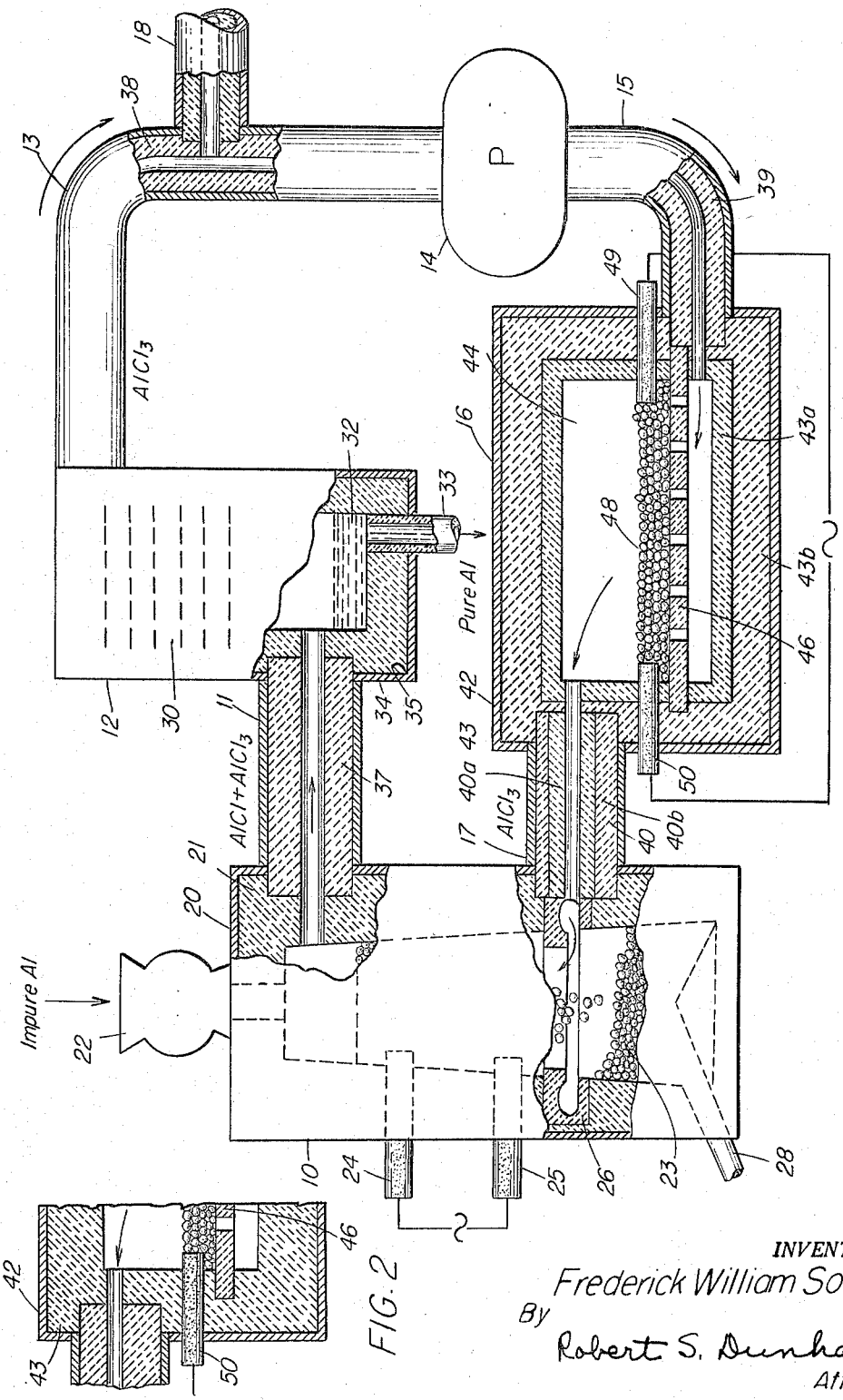

3,284,189
PROCESS AND APPARATUS FOR REFINING ALUMINUM
Frederick William Southam, Arvida, Quebec, Canada, assignor to Aluminium Laboratories Limited, Montreal, Quebec, Canada, a corporation of Canada
Filed Mar. 10, 1965, Ser. No. 438,513
29 Claims. (Cl. 75—68)

This application is a continuation-in-part of copending application Serial No. 175,950, filed February 27, 1962, by applicant herein, Frederick William Southam, and now abandoned.

This invention is concerned with the refining of aluminum metal by so-called subhalide distillation, and is particularly related to apparatus and procedure for handling heated normal aluminum halide gas as employed in such subhalide refining, especially including methods and apparatus for heating the normal halide in gaseous form as or before it is carried to the reaction zone for treatment of impure aluminum.

In a particularly effective form of the subhalide distillation process, normal aluminum halide, as a gas, is brought into contact with impure or contaminated aluminum-bearing material, for reaction which converts aluminum of such material into a gaseous subhalide of aluminum, such reaction being effected at elevated temperature in a suitable reactor or furnace, conveniently called a converter. The gaseous subhalide, usually also carrying a quantity of unreacted normal halide, is conducted to a so-called decomposer (which has sometimes also been called a condenser), where at a somewhat lower temperature a reverse chemical reaction occurs, involving dissociation of the subhalide to yield relatively pure aluminum metal which is collected as the product. This reverse reaction also yields the normal halide, which together with the previously unreacted quantity of such compound, constitutes a gaseous discharge from the decomposer.

In such operations, provision is conveniently made for re-using the normal aluminum halide, either by direct circulation or after intermediate condensation and re-evaporation, together with any further quantities of such normal halide as may be required to make up for losses. The supply of normal aluminum halide, for instance aluminum trichloride, which travels to the converter for the first reaction described above, is advantageously heated to an appropriate elevated temperature, e.g. approaching or equaling that to be employed in the conversion reaction. Such preheating of the halide is very desirable, especially if it has been made available by recirculation as described above, in that the effectiveness and efficiency of the conversion reaction is thereby greatly aided. To the latter end, the stream of normal halide gas, on its way to the converter, may traverse a heating device, which may comprise, for example, a chamber containing a bed of carbonaceous material such as coke, which is heated by passing electric current through it or by application of some other source of heat energy.

The present invention is designed to overcome certain difficulties which were bound to arise in or as a result of the preheating operation, particularly in the functioning of the heater of the type which has been described above by way of example.

A suitable form of heater for the normal halide gas, was proposed as a chamber having an outer steel shell of gas-tight nature, having an insulating and refractory lining, such lining structure comprising a substantial layer of fire clay brick or the like immediately adjacent the shell, to constitute primarily a thermal insulating body. Interiorly of the fire clay insulation, there was a further layer or lining constituted of alumina, e.g. in the form of bricks or a settable mixture, cast in place, and intended to protect the first-described layer, while maintaining a surface which in exposure to the aluminum trichloride gas would be relatively inert. In operation of such a heating device for supply of highly heated normal aluminum halide gas, e.g. at temperatures of 1200° C. and upwards, it is necessary in practice that the heating chamber have effective thermal insulation, i.e. for the usual purpose of avoiding heat loss. The described body of fire clay or the like, being a silicious refractory material, is recognized as having good heat insulation properties, and indeed is employed in a variety of equipment where extremely high temperatures are involved (as here) and conservation of heat energy as well as protection of outer metal structures, would be important.

In operation of a system including a heater of this character, wherein the halide gas, particularly aluminum trichloride gas, was passed upward through a bed of hot coke, difficulty arose by the formation of bulky deposits of foreign solid matter above the bed and in the outlet piping. These deposits eventually choke the equipment, i.e. block the desired voluminous flow of the gas. These deposits were found to consist of silicon carbide and it was then discovered that the trichloride gas had found its way, through the heavy layer of alumina brick, to the underlying fire clay insulation, where a reaction took place with the silica contained in the latter as silicate. This reaction yielded silicon chloride, also in gaseous form, which in turn then, in the presence of hydrogen, existing in the heater in small but significant amounts because of water vapor from materials employed in the system, reacted with the carbon of the heating bed, to produce a silicon carbide in solid state. Thus it appeared that the porosity of the aluminous refractory, even though the latter were used in the form of so-called dense alumina, allowed the gaseous normal halide to come in contact with the silica of the insulating layer. Since aluminum trichloride reacts readily with silica as such or as a silicate, even at temperatures as low as 200° C., to produce alumina and silicon chloride, it became apparent that such reaction was taking place.

In further pursuance of the discoveries of the invention, an important feature of the latter is the provision of a halide preheater, as of the character explained above, wherein the entirety of the refractory lining, both for protective and thermal insulation purposes, is constituted of certain refractory material or materials as hereinafter specified, and in particular, is essentially free of silica throughout. Thus, for instance, an improved heater of the type and for the purpose stated may comprise an outer steel shell, a first layer of a silica-free refractory material immeditely adjacent to the shell, to constitute primarily a thermal insulating body, and an inner layer of a silica-free refractory material, for protection and electrical insulation, the inner and outer layers together constituting the refractory lining for the heater shell. The term "inner layer" is used herein to means the innermost layer which is exposed to the gas in the vessel whereas the term "outer layer" means a layer disposed outwardly therefrom.

Specifically, in accordance with the invention, the inner layer of the heater lining (providing electrical insulation) is essentially free of silica and consists substantially entirely of a refractory material selected from the class consisting of alumina, silicon nitride, aluminum nitride, boron nitride, and silicon nitride-bonded silicon carbide. Very preferably the material of the inner layer is provided in so-called dense form, e.g. as dense pure alumina, dense silicon nitride, or other members of the same class in dense form, it being understood that the term "dense" as used herein refers to material having a density in a range between 75% and 100% of the theoretical value of density of such material. In addition, the electrical resistivity of the inner layer should be such as to provide adequate electrical insulating properties therefor. Refractory bodies of all the above-designated materials are available having suitable electrical resistivity; in the case of silicon nitride-bonded silicon carbide, the electrical resistivity increases with increasing silicon nitride content, and to provide an inner layer of the latter material it is presently preferred to use such material having relative proportions of silicon nitride and silicon carbide providing an electrical resistivity above 1000 ohm-cm. at the operating temperature of the heater.

Further in accordance with the invention, the outer layer of the heater lining, which need not necessarily provide electrical insulation (since this is afforded by the inner layer) but should insulate thermally, is also essentially free of silica and consists substantially entirely of a refractory material selected from the class consisting of alumina, silicon carbide, silicon nitride, aluminum nitride, and boron nitride. The term "silicon carbide" is used above and elsewhere herein to designate self-bonded silicon carbide refractory, unless otherwise specified. Advantageously, the material of the outer layer is provided in a thermally insulating (e.g. high-porosity or so-called "foam") form, particular examples of such material suitable for the outer layer being pure insulation alumina, e.g. having a density of approximately 30 lb./ft.$^3$, and foam silicon carbide, which is an insulating, self-bonded silicon carbide e.g. having a density of about 15 lb./ft.$^3$. Alternatively, material in dense form (such as dense alumina and dense aluminum nitride) may be used for the outer layer; the dense materials last mentioned are less desirable for the outer layer than the insulating or high porosity materials because these dense materials have higher thermal conductivity, but nevertheless they provide adequate heat insulation if the outer layer of the lining, consisting of such dense material, is made sufficiently thick.

As stated, in the process and apparatus of the invention the silica content of the heater lining should be minimal, e.g. less than 0.5% and very preferably not more than about 0.1% (all proportions here and elsewhere being stated by weight), and in particular even the outer layer should have not more than 5% silica and very preferably less than 1%. Apart from the requirement that the inner and outer layers be essentially silica-free, the purity of the constituent materials is of concern in that the materials should not contain impurities (especially oxides other than alumina) that react with aluminum trichloride, and also should not contain impurities affecting the thermal and electircal characteristics of the lining. For instance, presence of free silicon in a silicon nitride lining would afford too high an electrical conductivity for use in the electrically insulating inner layer.

The thickness of the inner and outer layers of the heater lining is selected to afford adequate electrical and thermal insulation. A suitable range of values of thickness for the inner layer, under the conditions encountered in the operation of an aluminum trichloride gas heater as herein contemplated, is between about 2 inches and about 5 inches for all the materials specified above for the inner layer. The thickness of the outer layer is selected with regard to the thermal insulation properties of the material used, and may be in a range, e.g., between about 9 inches and about 18 inches for the above-specified materials. As particular examples of suitable values of thickness for the outer layer, a 9 inch thick outer layer of pure insulation alumina, or a 13.5 inch thick outer layer of foam silicon carbide, or an 18 inch thick outer layer of dense alumina provides adequate thermal insulation. It will be apreciated that lining layers of thickness in excess of the values specified above may be employed if desired.

As will be appreciated, when the inner and outer layers described above are constituted of the same refractory material the heater lining may be considered as a single, relatively thick body of such material, and it is to be understood that reference herein to a heater lining constituted of inner and outer layers embraces the provision of such lining as a body of a single refractory material, i.e. wherein the inner and outer layers are not discrete.

Thus, a particular example of heater as herein contemplated may comprise an outer steel shell and a lining therein consisting only of a relatively thick body, e.g. of the order of one or two feet or more in thickness, which consists essentially only of alumina. Operation of such a heater was found to obviate entirely the formation of silicon carbide masses, or at least to prevent such formation to any extent which might block or impede the desired travel of halide gas. Stated with reference to the prior construction of the heater, wherein the backing of the lining constituted a siliceous refractory, the improved structure and procedure in such exemplary embodiment involved the maintenance of alumina material alone throughout the lining of the chamber or vessel, a particular requirement being that even the outer layer had substantially less than 5% silica and very preferably less than 1%. Thus, the improved structure of heater in such example embraces a steel or other suitable metallic shell having a relatively thick aluminous refractory lining, i.e. dimensioned to provide effective heating insulation as well as protection. For instance, whereas the earlier heater lining consisted of a 13.5 inch outer layer of fire clay and a 4.5 inch layer of alumina (exposed, innermost), the new construction utilized a 22.5 inch layer of alumina as the sole protective structure, adequate for heat insulation purposes, e.g. to reduce 1200° C. at the inner cavity to 300° C. at the shell. The total thickness of alumina may be somewhat less if the shell can stand a higher temperature (than 300°–350° C.), e.g. 500° C. with adequate external insulation.

Use of silica-free alumina to constitute both the inner and outer layers of the heater lining has particular advantages in that such material is readily available at relatively low cost, and provides particularly effective thermal and electrical insulation. More generally, however, operation of a heater using a lining in accordance with the invention having any combination of inner and outer layers of materials as specified above affords the advantage of preventing formation of silicon carbide deposits in the heater and heater gas outlet conduit.

It has also been found that for best results other portions of the gas circuit in the system should be similarly lined with an essentially silica-free refractory material, e.g. a material having a silica content of less than 0.1%. Such other parts of the system where similar silica-free refractory, e.g. alumina, is found important, include particularly the pipe or conduit structure which conveys the highly heated halide into the converter. The latter conduit structure may conveniently include an outer steel or like metallic shell; the internal lining of the conduit (providing thermal insulation therefor) in accordance with the invention again is constituted of an inner layer and an outer layer (which, as before, may be integral and formed of a single refractory material). Specifically, the inner layer of the conduit lining of the invention is, as stated, essentially silica-free and consists essentially entirely of a material selected from the class consisting of alumina, silicon nitride, aluminum nitride, boron nitride, silicon nitride-bonded silicon carbide, graphite, titanium carbide, silicon carbide and silicon carbide-bonded graphite; the latter four materials are suitable for the inner layer of the conduit lining notwithstanding their relatively low electrical resistivity because electrical insulation is not necessary in the heater gas outlet conduit. The outer layer of such conduit lining consists essentially of a material selected from the class consisting of alumina, silicon nitride, aluminum nitride, boron nitride, and silicon carbide. Again, use of silica-free alumina for both the inner and outer layers of the conduit lining has advantages from the standpoint of economy. The considerations above set forth with respect to purity of the materials used for the heater lining are applicable to the materials used for the conduit lining, except that, as stated, electrical insulating properties are not necessary for this lining.

In addition, when it is desired to provide a refractory lining for the piping for the normal halide gas coming from the decomposer (through a circulator or other pumping device) to the preheater, such lining should also be constituted of a silica-free refractory, as specified for the heater gas outlet conduit.

It will be understood that in the subhalide distillation process, the presently preferred compound used for treatment of the impure or contaminated aluminum is aluminum trichlroide (also commonly called aluminum chloride), i.e. $AlCl_3$, whereby the converted gaseous compound, which in effect transports the aluminum, is aluminium monochloride, i.e. AlCl, and it is alternatively possible to employ other halides such as aluminum tribromide, $AlBr_3$ (normal aluminum bromide), which correspondingly yields aluminum monobromide by the conversion reaction.

Further features and advantages of the invention will be apparent from the detailed description hereinbelow set forth, together with the accompanying drawings, wherein:

FIG. 1 shows, as an example of the system and procedure of the invention, in largely diagrammatic and simplified form, one embodiment of apparatus for subhalide refining, e.g. monochloride refining, wherein the normal halide is recirculated through a heater, for reuse in the converter; and FIG. 2 is a fragmentary view of the normal halide gas heater and outlet duct therefrom showing a lining wherein the inner and outer layers consist of identical material.

Referring to FIG. 1 which is largely schematic and illustrates essentially only the major or fundamental elements of a recirculating system, the impure aluminum, or aluminum alloy or mixture of aluminum with other materials, is treated in the converter 10 with aluminum trichloride, yielding a gaseous discharge through the conduit 11 which contains aluminum monochloride along with unreacted trichloride. In the decomposer 12 the monochloride undergoes reverse reaction, dissociating to yield aluminum metal, while the resulting gas, now consisting essentially of aluminum trichloride alone, is drawn through conduit 13 by a circulating pump 14 and thereby advanced through a further conduit 15 into the heater 16. From the latter it passes through a conduit 17 into the lower part of the converter 10, for repeated reaction with the material in the converter. Original supply of aluminum trichloride in vaporized, i.e. gaseous form, can be effected through a conduit 18 opening into a suitable part of the system, say the conduit 13, and further additions of the reagent may be similarly made as needed.

The structure and nature of the various components are in a number of respects unrelated to the present invention, i.e. in that these devices may assume various forms as may be or become known in the art, and in consequence detailed description otherwise than by way of simple example or reference seems unnecessary here. Thus, for instance, the converter 10 may be as described in United States Patent No. 2,937,082, issued May 17, 1960, on the application of A. H. Johnston et al., embodying an upright cylindrical furnace-like chamber having an outer steel shell 20 and lined with a thick layer of refractory material 21. Through an appropriately valved or locked hopper 22, successive increments of charge 23 are introduced, e.g. in the form of solid fragments, lumps, granules or the like, of the impure aluminum-containing metal to be treated. The charge fills the major part of the vessel, being heated by electrical resistance heating, as with current supplied to the electrodes 24, 25. Heated aluminum trichloride gas introduced through the conduit 17 and distributed around the chamber in the undercut channel 26, rises through the charge and reacts to convert aluminum metal to the subhalide, i.e. aluminum monochloride, which passes out with the unreacted trichloride in the conduit 11. The solid residue of the converter, substantially depleted of aluminum, can be withdrawn through a duct 28.

The decomposer 12 may assume any of various forms, and for simplicity of illustration is depicted as comprising an upright structure having an upper, baffled portion as indicated at 30, which is provided with suitable cooling means (not shown) and which effects the dissociating reaction so that pure or substantially pure molten aluminum collects in the bottom portion or well 32 of the decomposer, as for discharge through a conduit 33. The decomposer 12 may have an outer shell 34 of steel or the like, enclosing it in sealed relation, as in the case of the converter 10, and at least in its lower part may be provided with a heavy refractory lining 35.

The various conduit sections 11, 13, 15 and 17 may likewise be arranged with refractory linings as indicated respectively at 37, 38, 39 and 40, i.e. within outer tubular structure of steel or other appropriate metal; however, at least some of these conduits, in particular the conduit sections 13 and 15, may simply constitute unlined steel pipes, the conditions (including temperature) therein obtaining being in many instances such as not to require provision of a lining for these pipes. The lining of pipe 17, as hereinafter further explained, is shown as constituted by an inner layer 40a and an outer layer 40b. The pump or circulator 14 may have any convenient design, including moving elements (not shown) of graphite, carbon or other material of suitable strength and inertness.

The heater 16 comprises an outer, gas-tight shell 42 of steel or the like, and a relatively thick refractory lining 43 shown as constituted by an inner electrically-insulating layer 43a and an outer thermally insulating layer 43b. The lining 43 is arranged to provide an enclosed, insulated chamber 44 through which the normal halide gas, i.e. aluminum trichloride, may pass from the inlet of pipe 15 at the lower part of one end to the outlet into pipe 17 at an upper part of the opposite end. On a perforated supporting structure, preferably made of or faced with non-conducting material such as alumina, and here simply shown as a plate 46 which horizontally divides the chamber 44, there is disposed a bed of carbon granules or lumps 48, which are heated in suitable fashion, as by passage of electric current through them, between graphite electrodes 49, 50. The lumps, fragments or granules of carbonaceous material 48 may be petroleum coke, so-called ash-free carbon, graphite, appropriately purified coke of coal origin, or the like, it being particularly important that this carbonaceous material be essentially free of silica, e.g. as less than 0.1% silicon by weight.

In accordance with the present invention, the lining 43 of the heater is constituted of an essentially silica-free inner layer 43a of refractory material providing electrical insulation and an essentially silica-free outer layer 43b of refractory material providing thermal insulation. The inner layer consists essentially entirely of one of the following refractory materials: alumina, silicon nitride, aluminum nitride, boron nitride, and silicon nitride-bonded silicon carbide, preferably in so-called dense form, as stated above. The outer layer consists essentially entirely of one of the following refractories: alumina, silicon carbide, silicon nitride, aluminum nitride, and boron nitride, advantageously in a thermally-insulating (e.g. high porosity or so-called "foam") form. Also as indicated above, the silica content of the lining 43 should be minimal, for example, less than 0.5%, and very preferably no more than 0.1%. It is conceived that the outer layers of the material may have a slightly higher silica content than those immediately adjacent the heating space 44, for instance up to say 5% in region adjacent the shell, with correspondingly no more than a trace or at most 0.1% in the innermost exposed layer.

By way of specific example of a suitable lining for the heater 16 in accordance with the invention, the inner layer 43a may consist essentially entirely of dense pure alumina in a thickness of between about 2 inches and 5 inches, with an outer layer 43b consisting essentially entirely of pure insulation alumina (with a density of about 30 lb./ft.$^3$) and having a thickness of about 9 inches. As another example, the inner layer 43a may consist essentially entirely of dense silicon nitride-bonded silicon carbide (of a composition providing for such layer an electrical resistivity of above 1000 ohm-cm.) and again having a thickness of between about 2 inches and about 5 inches, and an outer layer 43b of foam silicon carbide (with a density of about 15 lb./ft.$^3$) having a thickness of about 13.5 inches.

As still another example, the inner and outer layers of the lining 43 may be constituted of a single refractory material and in such case may be integral, i.e. as shown in FIG. 2 the lining 43 may be provided as a unitary refractory body without discrete inner and outer layers. Thus, for instance, the lining 43 may be composed essentially completely of alumina and may be made, for example, of so-called 99% pure alumina bricks, which preferably have a silica content of not more than 0.2%. In order to afford not only the desired protective effect but especially thermal insulation (to conserve heat and avoid or reduce attack on the steel shell at high temperature) the alumina structure should be relatively thick, e.g. ordinarily at least about one foot and preferably more, even to two feet or so.

As will be seen, the gaseous trichloride enters the lower part of the chamber 44, passes through the perforations in the supporting partition 46 and traverses the highly heated carbon bed 48 so as to discharge at the top, through the conduit 17, at an appropriately elevated temperature, e.g. 1200° C. or higher. It has been found that with the lining 43 constituted in accordance with the present invention there is no formation of silicon carbide deposits, such as were found to occur, e.g. at the top of the bed and in the outlet conduit, with heater structures that included a fire clay lining portion adjacent the ferrous metal shell.

As indicated above, it is desirable that the lining 40, of pipe 17, also be constituted of essentially silica-free inner and outer layers 40a and 40b consisting essentially of material respectively selected from classes hereinabove specified for the material of the inner and outer layers of the heater gas outlet conduit. These inner and outer layers, as in case of the heater lining, may be composed of a single refractory material (for example alumina), and in such case the conduit lining 40 (as shown in FIG. 2) may be a unitary body without discrete inner and outer layers. As a particular example of such conduit lining, the entire lining 40 may be composed essentially of 99% pure alumina (with a silica content preferably not more than 0.2%) and of a thickness corresponding to the alumina heater lining described above, i.e. at least about 1 foot in thickness and preferably more, even to 2 feet or so, since the conduit 17 is subjected to gases at a temperature corresponding to that in the heater.

Although the gas traversing the pipes 13 and 15 is at a relatively low though elevated temperature, it may nevertheless there react with silica to form a halide of silicon, which may create trouble in the form of bulky deposits when the gas thereafter becomes highly heated in the presence of carbon, at the preheater 16. Hence, when it is desired to provide a refractory lining for the latter pipes, it is useful to employ for such lining silica-free refractory material as in the case of pipe 17. For example, the conduits 13 and 15 may be lined with essentially pure alumina. Since the gas temperature in these conduits is lower than in the heater 16 and pipe 17, less insulation is required, e.g. about 6 inches or so of alumina where the gas traversing the pipes is at a temperature of 700° C.

In operation, a charge of impure material is fed downward through the converter, where the monohalide reaction is effected under appropriate temperature and pressure, i.e. selected in accordance with known principles. Suitable temperatures are ordinarily in the range of 1000° C. and upward, and very preferably 1200° C. and above, e.g. 1300° C. to 1400° C., while atmospheric or sub-atmospheric pressures may be utilized, or indeed somewhat higher pressures, as considerations of temperature and efficiency may dictate. In the decomposer, with appropriate cooling, the monochloride is essentially all dissociated, for collection of substantially pure molten aluminum in the well 32, while the trichloride vapor, including that which is reconstituted, passes on, by the circulator 14, to traverse the heater 16, where the electrically energized bed 48 brings it back to a desired high temperature. Preferably the temperature reached in the gas at the preheater 16 is at least about as high as that to be maintained in the converter 10, appropriate examples being temperatures of 1200° C. to 1300° C. or higher. It will be understood that although the silicon halide-forming reaction takes place at lower temperatures, e.g. 200° C. and above, the reaction of the silicon compound with carbon, in the presence of hydrogen, chiefly occurs at temperatures of 1200° C. and higher. Hence the invention is of particular significance as related to the operation of preheating the aluminum trichloride gas and a special feature of the invention resides in an improved heater of the described construction and composition, for such gas.

Unless otherwise indicated, the term "silica" is used herein, and in the appended claims to mean silica whether present as such, or as some other oxidized compound of silicon, for instance silicates or complex silicates. Thus, fire clay, the common, insulating refractory mentioned above, it essentially an aluminum silicate. In all cases proportions of silica are measured as $SiO_2$.

It is to be understood that the invention is not limited to the specific structures and steps herein shown and described but may be carried out in other ways without departure from its spirit.

I claim:

1. In a subhalide process of refining aluminum wherein gas consisting essentially of normal halide of aluminum is advanced along a conduit path, including a heating region where carbonaceous material is exposed to the gas at a temperature above 1000° C., to a converting region where said halide is reacted with the aluminum of a quantity of impure aluminum, under the influence of heat, to yield gas containing aluminum subhalide, the method of heating said first-mentioned gas while preventing formation of silicon carbide deposits in said path, which comprises advancing said first-mentioned gas along said path while elevating the temperature of said first-mentioned gas in said heating region to a temperature above 1,000° C. and while keeping said first-mentioned gas substantially out of contact with silica, by providing said conduit path in said heating region with a lining of refractory material which is essentially free of silica, said lining being constituted of an inner layer which consists substantially wholly of refractory material selected from the class consisting of alumina, silicon nitride, aluminum nitride, boron nitride, and silicon nitride-bonded silicon carbide and contains no more than about 0.5% silica, and an outer layer which consists substantially wholly of refractory material selected from the class consisting of alumina, silicon carbide, silicon nitride, aluminum nitride, and boron nitride and contains no more than about 5% silica.

2. In a subhalide process of refining aluminum wherein gas consisting essentially of normal halide of aluminum is advanced along a conduit path, including a heating region where carbonaceous material is exposed to the gas at a temperature above 1000° C., to a converting region where said halide is reacted with the aluminum of a quantity of impure aluminum, under the influence of heat, to yield gas containing aluminum subhalide, the method of heating said first-mentioned gas while preventing formation of silicon carbide deposits in said path, which comprises advancing said first-mentioned gas along said path while elevating the temperature of said first-mentioned gas in said heating region to a temperature above 1,000° C. and while keeping said first-mentioned gas substantially out of contact with silica, by providing said conduit path in said heating region with a lining of refractory material which consists substantially wholly of alumina and is essentially free of silica, said lining being constituted of an inner layer which contains no more than about 0.5% silica and an outer layer which contains no more than about 5% silica.

3. A process according to claim 2, wherein said lining of refractory material contains no more than about 0.5% silica.

4. In a subhalide process of refining aluminum wherein gas consisting essentially of aluminum trichloride is advanced along a metal-encased path, including a refractory-lined heating region wherein said gas is exposed to carbonaceous material at a temperature of at least about 1200° C., to a converting region where said trichloride is reacted with the aluminum of a quantity of impure aluminum, under the influence of heat, to yield gas containing aluminum monochloride, the method of heating said first-mentioned gas while preventing formation and deposit of silicon carbide in said path by the first-mentioned gas, which comprises advancing said first-mentioned gas along said path while elevating the temperature of said first-mentioned gas in said heating region to a temperature of at least about 1,200° C. and while keeping said first-mentioned gas substantially out of contact with silica, by constituting the refractory lining of said heating region of an inner layer which consists substantially wholly of material selected from the class consisting of alumina, silicon nitride, aluminum nitride, boron nitride and silicon nitride-bonded silicon carbide and contains no more than about 0.5% silica, and an outer layer which consists substantially wholly of material selected from the class consisting of alumina, silicon carbide, silicon nitride, aluminum nitride, and boron nitride and contains no more than about 5% silica.

5. A process according to claim 4, wherein said inner layer consists substantially wholly of alumina.

6. A process according to claim 4, wherein said inner layer consists substantially wholly of silicon nitride-bonded silicon carbide.

7. A process according to laim 4, wherein said outer layer consists substantially wholly of alumina.

8. A process according to claim 4, wherein said outer layer consists substantially wholly of silicon carbide.

9. In a subhalide process of refining aluminum wherein gas consisting essentially of aluminum trichloride is advanced along a metal-encased path, including a refractory-lined heating region wherein said gas is exposed to carbonaceous material at a temperature of at least about 1200° C., to a converting region where said trichloride is reacted with the aluminum of a quantity of impure aluminum, under the influence of heat, to yield gas containing aluminum monochloride, the method of heating said first-mentioned gas while preventing formation and deposit of silicon carbide in said path by the first-mentioned gas, which comprises advancing said first-mentioned gas along said path while elevating the temperature of said first-mentioned gas in said heating region to a temperature of at least about 1,200° C. and while keeping said first-mentioned gas substantially out of contact with silica, by constituting the refractory lining of said heating region of material which consists substantially wholly of alumina and is essentially free of silica, said lining being constituted of an inner layer which contains no more than about 0.5% silica and an outer layer which contains no more than about 5% silica.

10. In apparatus for subhalide refining of aluminum, wherein impure aluminum is treated in a converter with gaseous normal halide of aluminum, metal-encased structure for heating and conducting to said converter a gas consisting essentially of said normal halide, comprising a heater for raising the temperature of the gas to a value greater than about 1000° C., a first conduit for leading the gas to the heater and a second conduit for leading the gas from the heater to the converter, said heater including carbonaceous material arranged to be exposed to the gas at high temperature, and said heater being lined with refractory material, the refractory lining of the heater being constituted of an inner layer which consists substantially entirely of refractory material selected from the class consisting of alumina, silicon nitride, aluminum nitride, boron nitride and silicon nitride-bonded silicon carbide and is essentially free of silica, and an outer layer which consists substantially entirely of refractory material selected from the class consisting of alumina, silicon carbide, silicon nitride, aluminum nitride, and boron nitride and is essentially free of silica.

11. Apparatus as defined in claim 10, wherein said inner layer consists substantially entirely of dense pure alumina.

12. Apparatus as defined in claim 10, wherein said inner layer consists substantially entirely of dense silicon nitride-bonded silicion carbide.

13. Apparatus as defined in claim 10, wherein said outer layer consists substantially entirely of pure insulation alumina.

14. Apparatus as defined in claim 10, wherein said outer layer consists substantially entirely of foam silicon carbide.

15. Apparatus as defined in claim 10, wherein said outer layer consists substantially entirely of dense pure alumina.

16. Apparatus as defined in claim 10, wherein said second conduit is lined with refractory material, the refractory lining of said second conduit being constituted of an inner layer which consists substantially entirely of material selected from the class consisting of alumina, silicon nitride, aluminum nitride, boron nitride, silicon nitride-bonded silicon carbide, graphite, titanium carbide, silicon carbide, and silicon carbide-bonded graphite and is essentially free of silica, and an outer layer which consists substantially entirely of material selected from the class consisting of alumina, silicon nitride, aluminum nitride, boron nitride, and silicon carbide and is essentially free of silica.

17. Apparatus as defined in claim 10, wherein said inner layer is at least about 2 inches thick, and wherein said outer layer is at least about 9 inches thick.

18. Apparatus as defined in claim 17, wherein said inner layer consists substantially entirely of dense pure alumina and wherein said outer layer consists substantially entirely of pure insulation alumina.

19. Apparatus as defined in claim 17, wherein said inner layer consists substantially entirely of dense pure alumina and wherein said outer layer consists substantially entirely of dense pure alumina and is at least about 18 inches thick.

20. Apparatus as defined in claim 17, wherein said inner layer consists substantially entirely of dense silicon nitride-bonded silicon carbide having an electrical resistivity of at least about 1000 ohm-cm. at the operating temperature of the heater, and wherein said outer layer consists substantially entirely of foam silicon carbide and is at least about 13.5 inches thick.

21. In apparatus for subhalide refining of aluminum wherein impure aluminum is treated in a converter with gaseous normal halide of aluminum, metal-encased structure for heating and conducting to said converter a gas consisting essentailly of said normal halide, comprising a heater, for raising the temperature of the gas to a value greater than bout 1000° C., a first conduit for leading the gas to the heater and a second conduit for leading the gas from the heater to the converter, said heater including carbonaceous material arranged to be exposed to the gas at high temperature, and said heater being lined with refractory material which consists substantially entirely of alumina and is essentially free of silica.

22. Apparatus as defined in claim 21, wherein the refractory lining of the heater, for insulating the metal casing thereof, is at least about one foot thick.

23. In apparatus for subhalide refining of aluminum wherein impure aluminum is treated in a converter with gaseous normal halide of aluminum, metal-encased structure for heating and conducting to said converter a gas consisting essentially of said normal halide, comprising a heater for raising the temperature of the gas to a value greater than 1000° C., and a conduit for leading the gas from the heater to the converter, said heater including carbonaceous material arranged to be exposed to the gas, and said heater being lined with refractory material which consists substantially entirely of alumina and is essentially free of silica, and which for insulating the metal casing of the heater is at least about one foot thick.

24. In apparatus for subhalide refining of aluminum wherein impure aluminum is treated with gaseous normal halide of aluminum, a heater for said gaseous normal halide, comprising a refractory-lined, metal-encased chamber for passage of said gaseous normal halide therethrough, and carbonaceous means in said chamber, arranged to be heated for transfer of heat to the passing gaseous halide, the refractory lining of said chamber within the metal casing being essentially free of silica and being constituted of an inner layer consisting substantially entirely of refractory material in dense form selected from the class consisting of alumina, silicon nitride, aluminum nitride, boron nitride, and silicon nitride-bonded silicon carbide, and an outer layer consisting substantially entirely of refractory material selected from the class consisting of alumina, silicon carbide, silicon nitride, aluminum nitride, and boron nitride.

25. In apparatus for subhalide refining of aluminum wherein impure aluminum is treated with gaseous normal halide of aluminum, a heater for said gaseous normal halide, comprising a refractory-lined, metal-encased chamber for passage of said gaseous normal halide therethrough, and carbonaceous means in said chamber, arranged to be heated for transfer of heat to the passing gaseous halide, the refractory lining of said chamber within the metal casing consisting substantially entirely of alumina and being essentially free of silica.

26. Apparatus as defined in claim 25, wherein said lining contains not more than about 0.5% silica, said outer layer containing not more than 5% silica.

27. Apparatus for heating a stream of gaseous normal halide of aluminum, comprising a vessel having a metal shell, a refractory lining inside said metal shell and means for inlet and outlet of the gaseous halide to pass through the vessel, and a body of carbonaceous material inside the vessel, arranged to be heated for transfer of heat to the passing gaseous halide, said refractory lining consisting essentially wholly of alumina and containing no more than about 0.1% silica.

28. Apparatus for heating a stream of gaseous normal halide of aluminum, comprising a vessel having a metal shell, a refractory, thermally insulating lining inside said metal shell and means for inlet and outlet of the gaseous halide to pass through the vessel, and a body of carbonaceous material inside the vessel, having heating means therefor and arranged to transfer heat to the passing gaseous halide, said refractory lining consisting substantially wholly of alumina and being essentially free of silica and having a thickness sufficient to prevent the temperature of the shell from exceeding about 500° C. when the temperature inside the vessel is about 1200° C.

29. In a subhalide process of refining aluminum wherein gas consisting essentially of normal halide of aluminum is advanced along a conduit path, including a heating region where carbonaceous material is exposed to the gas at a temperature above 1,000° C., to a converting region where said halide is reacted with the aluminum of a quantity of impure aluminum, under the influence of heat, to yield gas containing aluminum subhalide, the method of heating said first-mentioned gas while preventing formation of silicon carbide deposits in said path, which comprises advancing said first-mentioned gas along said path while keeping said first-mentioned gas substantially out of contact with silica, by providing said conduit path in said heating region with a lining of refractory material which is essentially free of silica, said lining being constituted of an inner layer which consists substantially wholly of refractory material selected from the class consisting of alumina, silicon nitride, aluminum nitride, boron nitride, and silicon nitride-bonded silicon carbide and contains no more than about 0.5% silica, and an outer layer which consists substantially wholly of refractory material selected from the class consisting of alumina, silicon carbide, silicon nitride, aluminum nitride, and boron nitride and contains no more than about 5% silica.

References Cited by the Examiner

UNITED STATES PATENTS

| | | | |
|---|---|---|---|
| 2,670,573 | 3/1954 | Sullivan. | |
| 2,914,398 | 11/1959 | Johnston et al. | 75—68 |
| 2,937,082 | 5/1960 | Johnston et al. | 75—68 |
| 3,078,159 | 2/1963 | Hollingshead et al. | 75—68 |
| 3,099,589 | 7/1963 | Tanaka. | |

OTHER REFERENCES

Jacobson: Encyclopedia of Chemical Reactions, volume VI, Reinhold Publishing Co.

Sneed et al.: Comprehensive Inorganic Chemistry, volume VIII, D. Van Nostrand Co., Inc.

DAVID L. RECK, *Primary Examiner.*

H. W. TARRING, *Assistant Examiner.*

UNITED STATES PATENT OFFICE
CERTIFICATE OF CORRECTION

Patent No. 3,284,189

November 8, 1966

Frederick William Southam

It is hereby certified that error appears in the above numbered patent requiring correction and that the said Letters Patent should read as corrected below.

Column 11, line 50, for the claim reference numeral "25" read -- 24 --.

Signed and sealed this 12th day of September 1967.

(SEAL)
Attest:

ERNEST W. SWIDER
Attesting Officer

EDWARD J. BRENNER
Commissioner of Patents